United States Patent [19]
Riede

[11] Patent Number: 6,003,295
[45] Date of Patent: Dec. 21, 1999

[54] SPINNING BOX FOR AN OPEN-END SPINNING MACHINE

[75] Inventor: Brigitte Riede, Moenchengladbach, Germany

[73] Assignee: W. Schlafhorst AG & Co., Moenchengladbach, Germany

[21] Appl. No.: 09/079,072

[22] Filed: May 14, 1998

[30] Foreign Application Priority Data

May 14, 1997 [DE] Germany ................. 197 20 141

[51] Int. Cl.⁶ .................................................. D01H 13/26
[52] U.S. Cl. .................... 57/263; 57/301; 57/304; 57/406
[58] Field of Search .................. 57/263, 301, 302, 57/304, 305, 406

[56] References Cited

U.S. PATENT DOCUMENTS

| | | | |
|---|---|---|---|
| 3,683,446 | 8/1972 | Tell | 15/330 |
| 4,038,812 | 8/1977 | Stahlecker | 57/56 |
| 4,069,654 | 1/1978 | Roehrich | 57/56 |
| 4,485,616 | 12/1984 | Morita et al. | 57/261 |
| 4,487,012 | 12/1984 | Horiuchi et al. | 57/261 |
| 4,676,059 | 6/1987 | Artzt et al. | 57/263 |
| 5,640,839 | 6/1997 | Novotny et al. | 57/301 |
| 5,916,118 | 6/1999 | Wassenhoven et al. | 57/304 |
| 5,916,119 | 6/1999 | Lovas et al. | 57/263 |

FOREIGN PATENT DOCUMENTS

| | | |
|---|---|---|
| 26 51 551 A1 | 10/1977 | Germany . |
| 42 20 586 A1 | 1/1994 | Germany . |
| 42 39 837 A1 | 6/1994 | Germany . |
| 195 02 102 A1 | 8/1995 | Germany . |
| 196 24 537 | 6/1996 | Germany . |
| 44 45 740 A1 | 6/1996 | Germany . |

*Primary Examiner*—William Stryjewski
*Attorney, Agent, or Firm*—Kennedy Covington Lobdell & Hickman LLP

[57] ABSTRACT

In order that stray fibers do not settle in the rotor during the spinning start process at the spinning box of a rotor spinning machine, an openable air valve is provided for initially cleaned the rotor by delivering an air current into the rotor either by drawing ambient air through the valve as a consequence of the spinning vacuum or by blowing in compressed air through the valve. As an alternative to known spring-loaded ball valves pose the danger that the spring ceases to perform due to deposits of dust and fibers, the present invention provides a magnet arranged in association with the valve seat in the area of its valve opening to attract the ball, which consists of a magnetizable material, and thereby hold the ball in closed position.

7 Claims, 5 Drawing Sheets

SPINNING BOX FOR AN OPEN-END SPINNING MACHINE

BACKGROUND OF THE INVENTION

The present invention relates generally to open-end rotor spinning machines and more particularly to a spinning box for such machines.

When a yarn is broken at a spinning station of an open-end rotor spinning machine, or when spinning is to be started at a spinning station, a yarn end is inserted through the yarn withdrawal tube at the spinning station into the rotor in order to unite the yarn end with fibers delivered into the rotor from a sliver feed. The spinning process is initiated and progresses with the continuous feeding of fibers into the rotor and with the withdrawal of the yarn. The introduction of the yarn into the rotor as well as the delivery of the fibers must be precisely coordinated with one another in order that the area of the starter end of yarn does not differ in an unacceptable manner from the rest of the yarn in appearance and in quality.

A spinning start procedure requires particular care during the feeding in of the fibers. If a yarn breaks the sliver feed is immediately halted. The yarn is drawn as a rule out of the spinning chamber and therewith out of the rotor due to the high winding speed. It is customary to clean the rotor before every spinning start before the yarn is returned into the spinning chamber. This measure has a preventive nature in order to raise the quality of the yarn. Dirt which has collected in the rotor as well as fibers, which are problematic for the spinning start process, are to be removed by this cleaning. However, since the sliver remains introduced in the opening device, the opening cylinder continues to rotate and the spinning vacuum continues to be applied to the spinning chamber, it can not be excluded that fibers are transported into the rotor after a cleaning has been performed, while the standing rotor is waiting for the spinning start process, and collect at the lowest position in the fiber collection groove of the rotor. These uncontrolled fibers flying around in the spinning chamber can form flocks or stubs in the yarn by being deposited in the rotor during the spinning start and thus cause yarn defects. It is therefore important that no stray fibers settle in the rotor before the spinning start process. In order to be able to carry out the spinning start and the yarn formation without problematic fibers, German Patent Publication DE 44 45 740 A1 teaches generating an air current in the spinning chamber by opening a flap and maintaining this air current until the speed of the rotor has reached a value at which the centrifugal forces of the fibers bring about a settling of the fibers in the rotor groove which can no longer be influenced by the air current.

German Patent Publication DE 196 24 537 A1, which was filed earlier but published subsequently, teaches blowing compressed air centrally into the rotor cup in order to blow out the fibers which may disturb the spinning start process through the yarn withdrawal nozzle which is located opposite the rotor. To this end, a valve which closes the compressed air infeed is provided in the so-called hood of the spinning station, i.e., a cover covering the spinning chamber. The valve consists of a ball which is pressed against a sealing surface by a spring acting against the spinning vacuum. Under the action of the in-flowing compressed, the ball rises off of the sealing surface and the compressed air flows through the withdrawal nozzle into the rotor. If fibers and dust settle in the spring its elasticity is reduced as a consequence and a controlled air supply is no longer possible. Moreover, the spring can be blocked in such a manner that it is no longer capable of pressing the ball against the sealing surface so that false air can flow in through the valve during the spinning process.

SUMMARY OF THE INVENTION

It is accordingly an object of the present invention to provide an improved ball valve means in an open-end spinning station for reliably closing an opening for supply of air into the spinning station during the preparation and carrying out of the spinning start process and during the spinning process.

This objective is accomplished in the present invention by a spinning box for a spinning station of an open-end spinning machine, wherein the spinning box basically comprises a spinning chamber, means for applying a spinning vacuum within the spinning chamber, a rotor disposed in the spinning chamber for high speed rotation, and a cover for closing the chamber adjacent the rotor. As is known, the cover supports a device for feeding spinnable fibers into the rotor and a device for withdrawing spun yarn from the rotor. In addition, a ball valve is provided in the cover for supplying cleaning air into the rotor preparatory to start-up of a spinning operation, the valve being arranged to be actuated by a service device for performing a spinning start-up operation at the spinning station. According to the present invention, the valve comprises a valve seat defining a valve opening, a magnet arranged in association with the valve opening and a ball arranged for movement into and out of sealing engagement with the valve seat to close and open the valve opening. The ball comprises a magnetizable material to be biased into closing position in sealing engagement with the valve seat under the influence of the magnet, the magnet being selected to exert an attractive force on the ball which is greater than the force of suction exerted by the spinning vacuum on the ball.

The invention offers a simple and effective ball valve closure of the opening to a spinning chamber in an open-end spinning machine. Aside from the ball, no movable parts are provided, whose mobility could be hindered by the accumulation of fibers and dust. The valve is actuated by a manipulator arranged on a service device which can be delivered to the spinning stations for the start of a spinning operation and for the cleaning of the spinning chamber. The ball is returned automatically into the closed position by the magnet. If the ball is raised from its sealing surface or is released by the magnet, the valve opens to permit air flow past the ball and the sealing surface due to the spinning vacuum prevailing in the spinning chamber, which thereby brings about a cleaning of any accumulated dirt. The cleaning action is considerably increased if a compressed-air nozzle is delivered to the opening, during which the ball can be lifted by the compressed-air nozzle itself out of its closed position and the ball and sealing surface are positively blown with compressed air. The ball consists of a magnetizable material and the force exerted by the magnet on the ball is greater than the suction force exerted by the spinning vacuum on the ball so that the opening is always reliably closed. The selection of the magnet is therefore coordinated advantageously with the prevailing vacuum. Permanent magnets are especially suitable as magnets because, in contrast to electromagnets, they require no connections and no constant energy supply.

In order to achieve a uniform sealing of the opening by the ball it is advantageous if the magnet is centrally arranged annularly around the opening. The magnet itself can be designed as a sealing surface, which increases the attractive force on the ball and therewith the sealing action on account of the immediate proximity of ball and magnet. However, the magnet can also be arranged outside of the wall defining the opening to the spinning chamber. This arrangement is advantageous in the case of a retrofitting of a spring biased ball valve closure in which, for example, the spring pressing the ball into the closed position is removed. Due to the good accessibility the arrangement makes it possible to use electromagnets. It is not necessary in the case of an electromagnet that the ball be unseated by a compressed-air nozzle out of its closed position. If no compressed-air nozzle is provided, an interruption of the current supply to the electromagnet by the service device can be provided in order to release the ball and open the valve.

The invention will be explained and understood in greater detail by the description hereinbelow of exemplary embodiments with reference to the accompanying drawings.

DESCRIPTION OF THE PREFERRED EMBODIMENTS

Figure 1:
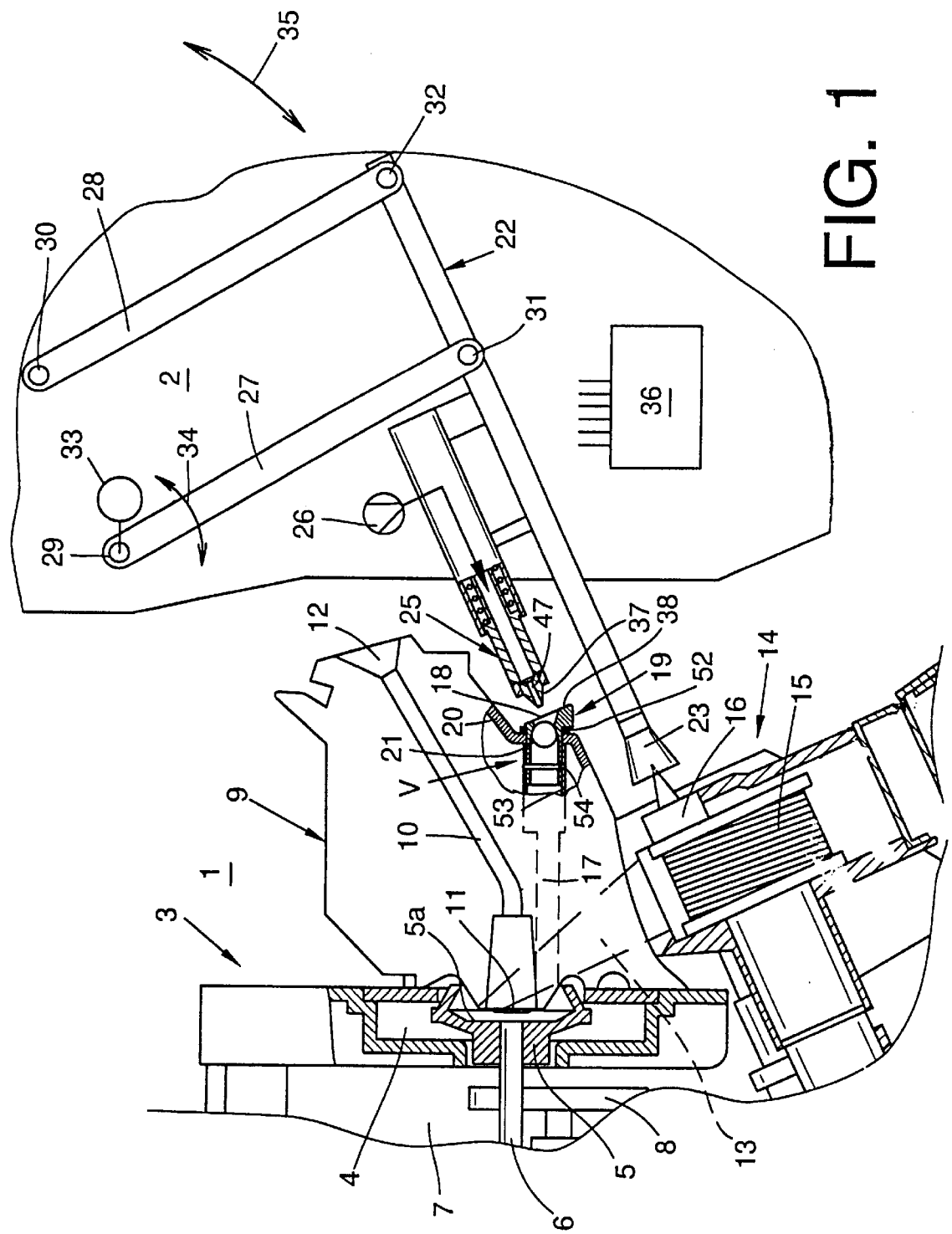
FIG. 1 is a side elevational view, partially in cross-section, of a spinning station equipped with a ball valve according to the present invention, depicting a service device positioned in front of the spinning station to deliver a manipulator to the spinning box for the drawing in of sliver and for opening the valve for the air supply, during which the ball is shifted by a compressed-air nozzle.

Referring now to the accompanying drawings and initially to FIG. 1, a part of a typical spinning station 1 of an open-end rotor spinning machine is depicted with an associated service device 2 positioned in front of spinning station 1, only the features of which are necessary to an understanding of the invention being shown and described. The spinning station 1 includes a spinning box 3 defining a spinning chamber 4 in which a rotor 5 rotates, the spinning chamber 4 being connected to a vacuum source (not shown here) in order to maintain a prevailing spinning vacuum within the spinning chamber 4. The spinning box 3 further includes a housing 7 which contains a drive and bearing for a shaft 6 of rotor 5 in the form of a so-called twin-disk bearing assembly 8 known from the state of the art, one disk of the twin-disk bearing 8 being shown. Spinning chamber 4 is closed by a cover 9, commonly referred to as a hood, in which yarn withdrawal tube 10 is arranged to extend from yarn withdrawal nozzle 11 located opposite rotor 5 to exit opening 12 in hood 9. Hood 9 also contains fiber guide conduit 13 through which the fibers combed out in opening device 14 from a sliver (not shown here) by opening cylinder 15 are transported into rotor 5. The feeding of the sliver takes place by means of a delivery roller (not shown per se) having an axially directed extension 16 which projects out of the housing of opening device 14 and is actuated by service device 2 for a controlled feeding of the sliver during the spinning start process.

Furthermore, hood 9 contains tube 17 which in the present exemplary embodiment opens at its inward end within spinning chamber 4 into rotor cup 5a of rotor 5 and opens at the other outward end of tube 17 through an opening 18 located in adapter 19 set into wall 20 of hood 9. The tube 17 serves to supply drawn-in air or compressed air into the spinning chamber and particularly into the rotor, especially for cleaning rotor cup 5a. Tube 17 can also empty, in correspondence with the exemplary embodiment in German Patent Publication DE 196 24 537 A1, behind the yarn withdrawal nozzle into the yarn withdrawal tube. Valve V, whose opening is closed by ball 21, is also located in adapter 19. Adapter 19 is manufactured from a non-magnetizable material and serves to receive an actuating device for opening the valve.

In the present exemplary embodiment, ball 21 is shifted out of its closed position, e.g. by nozzle mouth 37 of deliverable compressed-air nozzle 25 on service device 2. Service device 2 (not shown in detail here) is mounted in a movable manner on the spinning-machine frame, as is generally known from the state of the art. It travels along the spinning stations and performs the re-starting of spinning operation after a yarn break or bobbin replacement. To this end, service device 2 is provided, among other things, with manipulator 22 which carries drive 23 for the drawing-in roller adapted to be coupled with extension 16 of the drawing-in roller in order to feed in sliver during the process of re-starting spinning.

Figure 2:
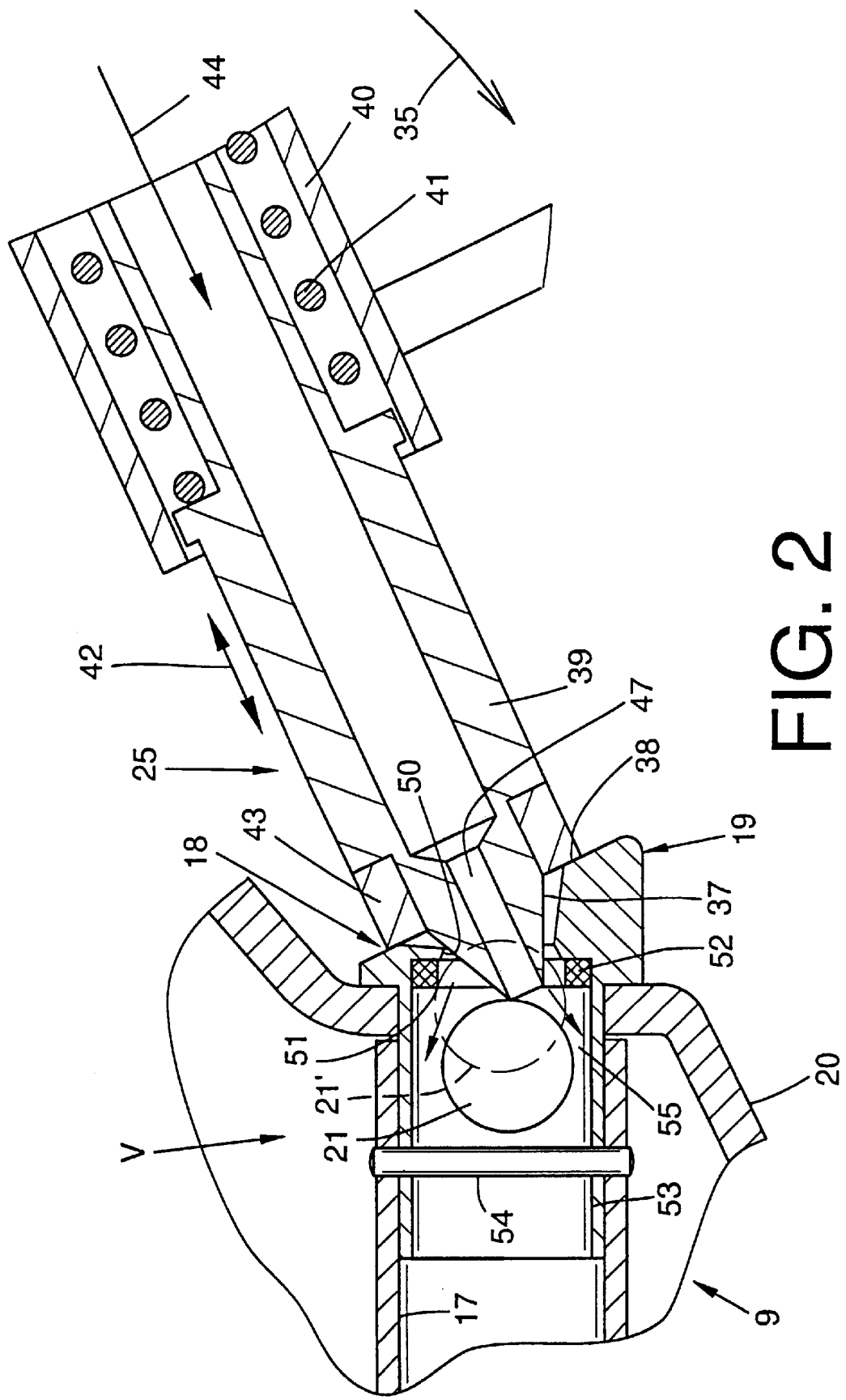
FIG. 2 is a more enlarged cross-section of the ball valve and the compressed air nozzle of FIG. 1, depicting an embodiment of the valve with a permanent magnet forming the sealing surface for the ball and showing the compressed-air nozzle being inserted into the valve opening.

When manipulator 22 is fully delivered to spinning box 3, as is shown in FIG. 2, mouth 38 of compressed-air nozzle 25 pushes ball 21 away from sealing surface 50 of adapter 19 and away from sealing surface 51 of magnet 52 inserted into adapter 19. Thereupon, air can flow into opening 18 through conduit 47 in compressed-air nozzle 25. The air is guided through line 17 into spinning chamber 4 and therewith into rotor 5. Spinning chamber and rotor are cleansed of stray fibers in this manner before the spinning start. This type of cleaning is known e.g. from German Patent Publication DE-OS 28 18 794. The cleaning of rotor 5 can be additionally supported by blowing in compressed air, as is indicated by arrow 44. To this end nozzle 25 is connected to a compressed-air source designated by symbol 26 (FIG. 1). As also shown in FIG. 1, manipulator 22 is pivotably arranged on service device 2. Two equally long rocker arms 27, 28 are mounted in swivel joints 29 and 30 on service device 2. Rocker arms 27, 28 carry manipulator 22 suspended in swivel joints 31, 32 on rocker arms 27 and 28. Rocker arm 27 can be pivoted by drive 33 about joint 29, as is indicated by double arrow 34. In this manner, it is possible to retract manipulator 22 during the travel of service device 2 and to deliver it after correct positioning in front of a spinning station 1 by pivoting outward toward the spinning location. The motion takes place in a circular arc with a large radius, as is indicated by double arrow 35. The travel of service device 2, the motion of manipulator 22 and operation of drive 23 of the drawing-in roller are controlled by control device 36 in service device 2.

FIG. 2 shows opening 18 with compressed-air nozzle 25 delivered into the opening in greater detail in cross-section. Opening 18 is formed within adapter 19 and is tapered in the shape of a funnel so that it can receive conical mouth 37 of compressed-air nozzle 25. Adapter 19 is set in wall 20 of hood 9 with tube 17 for supplying air into rotor 5 being connected to the adapter 19. Outer edge 38 of opening 18 serves as the stop for mouth 37 of compressed-air nozzle 25. Compressed-air nozzle 25 consists of tube 39 which tapers conically to form mouth 37. The tube 39 is shiftably mounted in another tube 40 which is supported against spring 41. As a result thereof, tolerances in bridging of the compressed-air nozzle 25 with spinning stations during the delivery of manipulator 22 can be compensated, as is indicated by double arrow 42. Sealing ring 43 of an elastic material, e.g. rubber, rests on sealing surface 38 in order to avoid an undesired exiting of air at opening 18. After the delivery of compressed-air nozzle 25, a valve (not shown) is opened and compressed air flows, as is indicated by arrow 44, from compressed-air source 26 (FIG. 1) through tube 39 into tube 17.

Ball 21 is normally held by magnet 52 in its closed position 21' indicated in dotted lines in FIG. 2. When conical mouth 37 of compressed-air nozzle 25 is inserted into the opening 18, ball 21 is pushed off sealing surface 50 of adapter 19 and out of its closed position 21' into the open position shown in full lines in FIG. 2. The magnet is designed in a ring shape and is supported within tubular extension 53 of adapter 19 in surrounding abutment against opening 18 at which, e.g., the magnet may be adhered. Magnet 52 can also form a sealing surface 51 on its annular inward surface facing the ball.

In the present exemplary embodiment, tube 17 extends telescopically over extension 53 of adapter 19 in order to convey the air into the spinning chamber and into the rotor. In order that ball 21 is not transported into the spinning chamber by the spinning vacuum prevailing in the spinning chamber or by the inflowing compressed air a stop 54 is provided in tubular extension 53 of adapter 19. The stop 54 may be a pin, for example, which runs transversely to extension 53 and can additionally serve to fix adapter 19 to wall 20. Protuberances extending into the tube and limiting the path of the ball are also possible.

When compressed air flows through conduit 47 out of compressed-air nozzle 25 into adapter 19, this air flows against ball 21, as is indicated by arrows 55. In addition, air vortices form which cover at least sealing surface 51, thereby loosening dust and fibers. In particular, the inflowing compressed air accelerates and intensifies the removal of any deposits of dirt or other contaminants in the area of opening 18.

Figure 3:
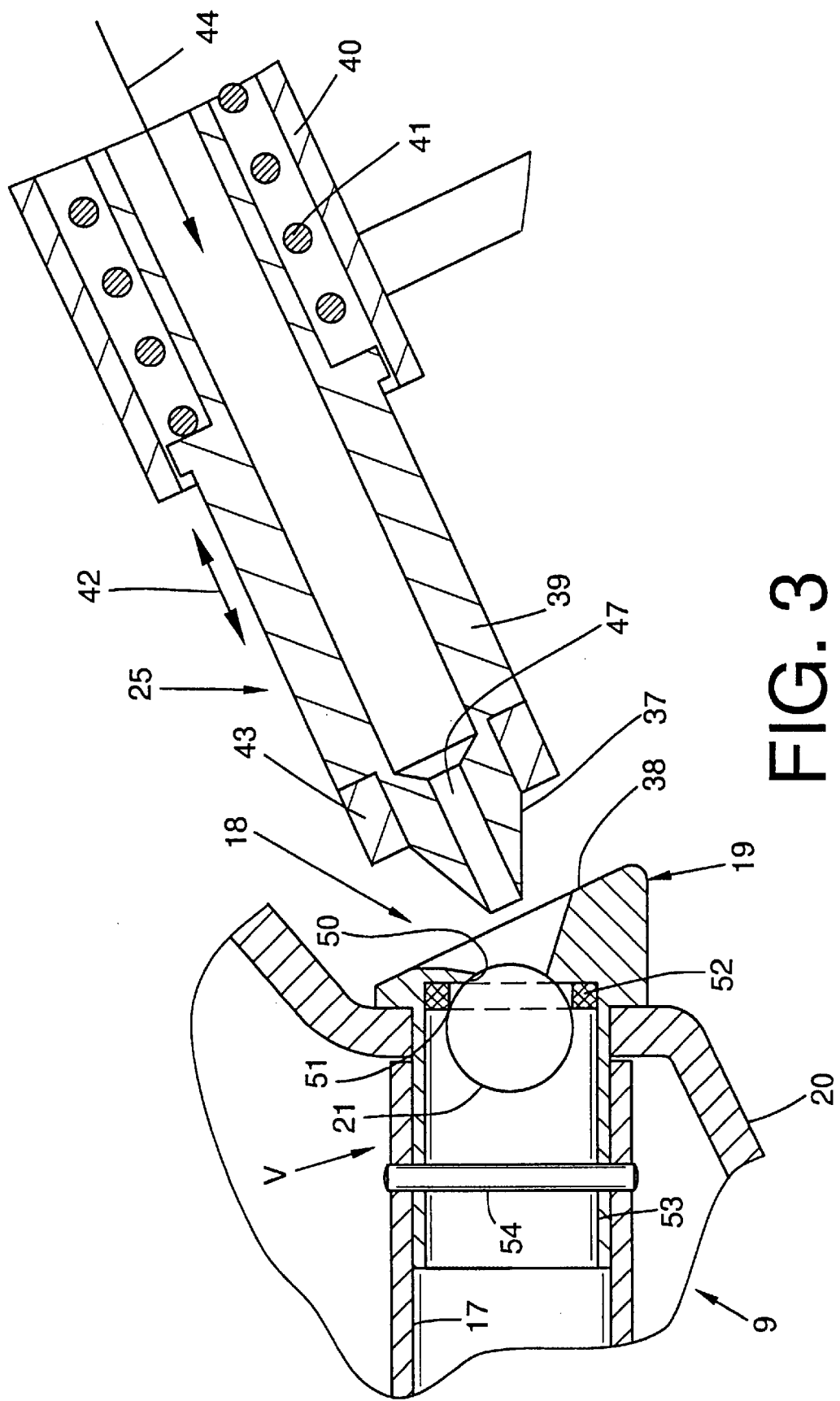
FIG. 3 is another enlarged cross-section of the ball valve and the compressed air nozzle similar to FIG. 2, but showing the valve opening in the closed state.

FIG. 3 shows the situation in which manipulator 22 has retracted compressed-air nozzle 25. Under the influence of magnet 52, ball 21 has been repositioned in front of opening 18 in abutment with sealing surface 50 of adapter 19 and sealing surface 51 of magnet 52, thereby closing and sealing the opening 18.

Figure 4:
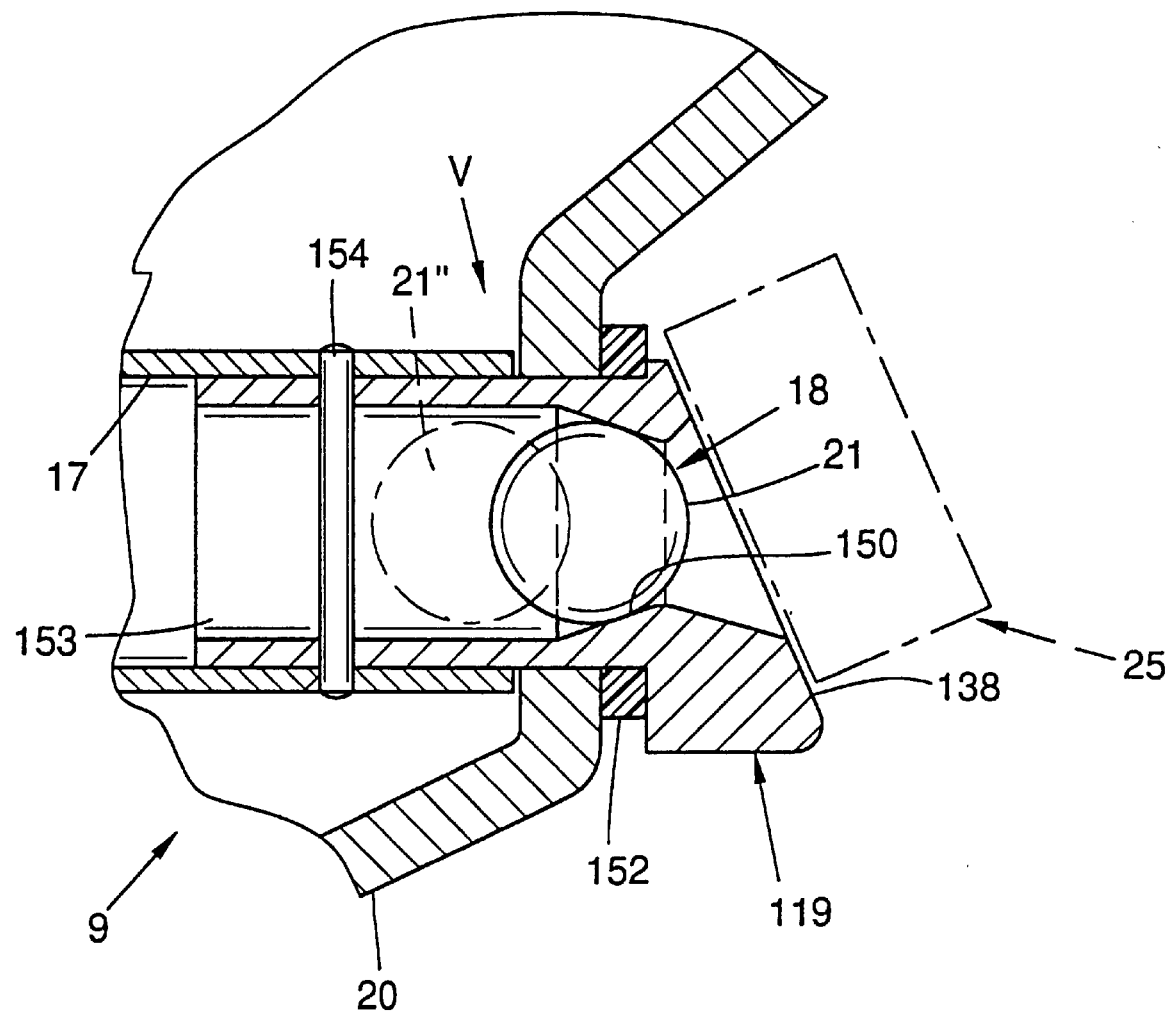
FIG. 4 is another enlarged cross-section of the ball valve and the compressed air nozzle similar to FIGS. 2 and 3, but depicting an alternative embodiment wherein the ball valve includes a permanent magnet arranged at the outside of the spinning box concentrically around the valve opening.

FIG. 4 shows an arrangement of the magnet in valve V according to another embodiment of the present invention. In this embodiment, ring-shaped magnet 152 is fitted onto adapter 119 manufactured from a non-magnetizable material and rests outside of opening 18 annularly thereabout. Magnet ring 152 is centered in the present exemplary embodiment between stop 138 for compressed-air nozzle 25 and wall 20 of the spinning box. Sealing surface 150 for ball 21 tapers conically toward opening 18 and centers ball 21 for closing opening 18 when seated against the surface 150. Tube 17, for supply of air into the rotor and into the spinning chamber, is fitted over tubular extension 153 in correspondence with the preceding exemplary embodiment of FIGS. 1–3. Hereagain, a stop 154 limits the path of ball 21 during the inflow of air. Stop 154 can also serve, as in the preceding embodiment, to fix adapter 19. When compressed-air nozzle 25 (shown in dotted lines) is delivered into opening 18, the ball is deflected from sealing surface 150 into position 21" shown in dotted lines and thereby opens valve V.

Figure 5:
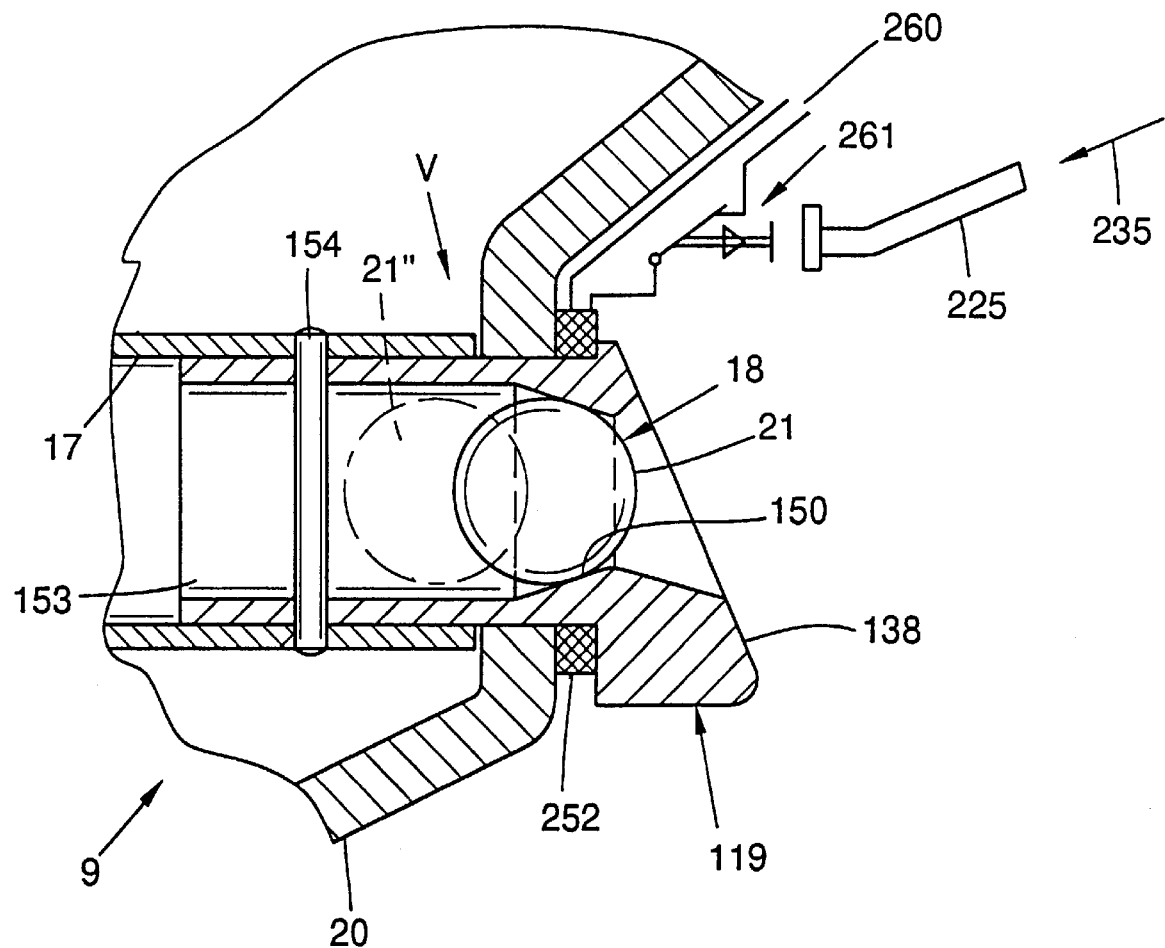
FIG. 5 is another enlarged cross-section of the ball valve and the compressed air nozzle similar to FIGS. 2–4, but depicting an alternative embodiment wherein ball valve includes an electromagnet magnet arranged at the outside of the spinning box concentrically around the valve opening, similar to FIG. 4.

FIG. 5 shows an arrangement of the magnet in valve V in correspondence with the embodiment according to FIG. 4. However, magnet 252 is an electromagnet in this exemplary embodiment, having connections 260 running to a current supply (not shown) with a depressable actuating switch 261 positioned within the current supply circuit. Switch 261 is normally closed to energize the magnet 252 but is arranged to can opened by an actuator 225 delivered by service device 2 (FIG. 1) to valve V in the direction of arrow 235. For example, actuator 225 can be arranged together with or instead of a compressed-air nozzle on manipulator 22 (FIG. 1), which can be delivered to the spinning box. If switch 261 is actuated, circuit 260 is interrupted, the magnetic field ceases and magnet 252 releases ball 21. Under the action of the spinning vacuum prevailing in the spinning chamber, ball 21 is separated from its sealing surface 150 and opens valve V so that air can flow into the spinning chamber. If actuator 225 is retracted and switch 261 is closed, magnet 252 is re-supplied with current so that a magnetic field is reestablished to attract ball 21 onto sealing surface 150 back into the closed position, thereby closing valve V.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A spinning box at a spinning station of an open-end spinning machine, the spinning box comprising a spinning chamber, means for applying a spinning vacuum within the spinning chamber, a rotor disposed in the spinning chamber for high speed rotation, and a cover for closing the chamber adjacent the rotor, the cover supporting a device for feeding spinnable fibers into the rotor, a device for withdrawing spun yarn from the rotor and a ball valve for supplying cleaning air into the rotor preparatory to start-up of a spinning operation, the valve being arranged to be actuated by a service device for performing a spinning start-up operation at the spinning station, the valve comprising a valve seat defining a valve opening, a magnet arranged in association with the valve opening and a ball arranged for movement into and out of sealing engagement with the valve seat to close and open the valve opening, the ball comprising a magnetizable material to be biased into closing position in sealing engagement with the valve seat under the influence of the magnet, the magnet being selected to exert an attractive force on the ball which is greater than the force of suction exerted by the spinning vacuum on the ball.

2. The spinning box according to claim 1, wherein the magnet is arranged annularly around the valve opening.

3. The spinning box according to claim 1, wherein the valve seat is a portion of the magnet.

4. The spinning box according to claim 1, wherein the magnet is a permanent magnet.

5. The spinning box according to claim 1, wherein the valve seat is configured to support the ball when engaged therewith in a position accessible by a compressed-air nozzle on the service device to move the ball away from the valve seat for injecting compressed air through the opening.

6. The spinning box according to claim 1, wherein the magnet is an electromagnet.

7. The spinning box according to claim 6, wherein the valve includes a switch for selectively energizing and de-energizing the magnet, the switch being arranged to be engagable by an actuator on the service device in order to de-energize the electromagnet and thereby release the ball and open the valve.

* * * * *